United States Patent [19]

Fraser

[11] 4,139,992
[45] Feb. 20, 1979

[54] SHELL FREEZER

[75] Inventor: Douglas S. Fraser, New Paltz, N.Y.

[73] Assignee: FTS Systems, Inc., Stone Ridge, N.Y.

[21] Appl. No.: 816,449

[22] Filed: Jul. 18, 1977

[51] Int. Cl.² ............................................. A23G 9/00
[52] U.S. Cl. ...................................... 62/345; 62/381; 366/235
[58] Field of Search .................... 62/345, 381, 63; 214/340; 366/233, 235; 426/524

[56] References Cited

U.S. PATENT DOCUMENTS

| | | | |
|---|---|---|---|
| 1,802,369 | 4/1931 | Birdseye | 62/345 X |
| 2,655,007 | 10/1953 | Lazar | 62/381 X |
| 2,951,353 | 9/1960 | Morrison | 62/375 |
| 3,218,731 | 11/1965 | Stinchfield | 34/62 |
| 3,238,736 | 3/1966 | MacIntosh | 62/63 |
| 3,283,523 | 11/1966 | Long | 62/63 |
| 3,389,568 | 6/1968 | Miller et al. | 62/63 |
| 3,695,895 | 10/1972 | Brown | 99/136 |
| 3,719,055 | 3/1973 | Shapley et al. | 62/345 X |
| 4,030,898 | 6/1977 | Morita | 62/345 |

*Primary Examiner*—William E. Wayner
*Assistant Examiner*—William E. Tapolcai, Jr.
*Attorney, Agent, or Firm*—Robert E. Wagner; Gerald T. Shekleton

[57] ABSTRACT

A shell freezer for the freezing of liquids in a container in a uniform layer on the interior walls of the container having belts rotating over rollers within a bath; rods are secured over the belts to act as stops for cylindrical containers placed on the belts, thereby causing the rotation of the containers. Underneath the rotating belt is a supportive platen which is covered with a fabric to allow smooth rotation of the belt while supporting a flask full of liquid. The bath may be tilted to a desired angle to allow more liquid to be frozen within a container. A novel heat exchanger cools the thermal transfer fluid which is circulated over the belts and back to the heat exchanger, to allow a minimum of such fluid in use.

13 Claims, 6 Drawing Figures

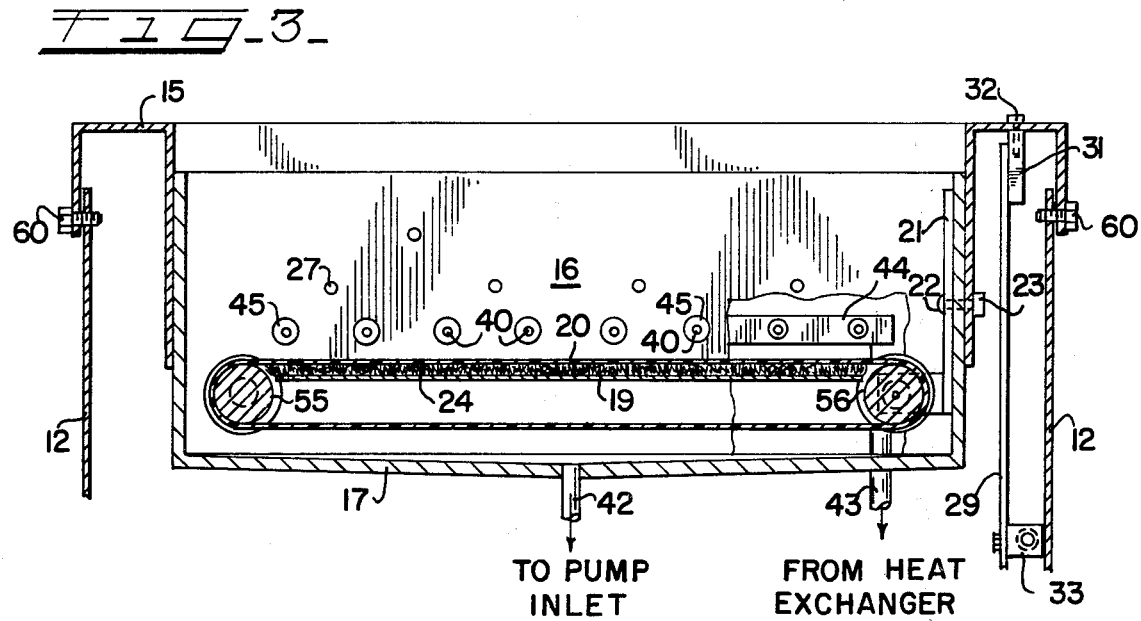
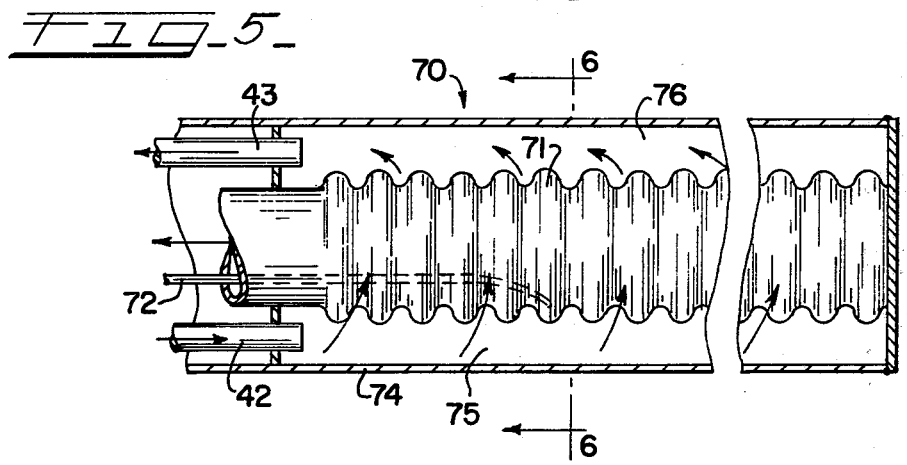
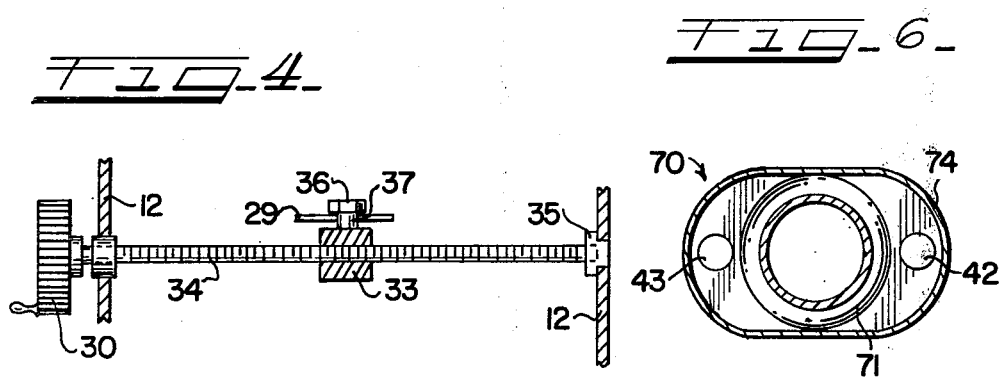

SHELL FREEZER

The subject invention relates to a method and apparatus for freezing liquids and, in particular, to shell freezing.

BACKGROUND OF THE INVENTION

The concept of shell freezing is well known in the prior art. It has been common place for some time now to rotate a flask of heat-sensitive material in a freezing solution of dry ice and acetone or similar freezing solution. The rotation of the flask brings the liquid material into contact with the cold wall of the flask where it freezes in an evenly distributed layer about the flask walls. If the material were to be freeze dried, the flask containing the frozen material would then be subjected to vacuum where the solvent could be more easily and quickly extracted due to the even layered surface area of the sample.

This simple shell freezer has been improved to provide a series of horizontal rollers submerged in a bath, the rollers rotating the flask within the bath. However, as freeze drying flasks generally have very large top openings, only a limited amount of liquid could be frozen in this manner without coming into contact with the top closure seal area and leaking out, or at least, destroying the seal. Thus, if too large an amount of liquid was placed in the flask to be freeze dried, the glass could not be stoppered after the freeze drying process was complete. A flask lift device was introduced to obviate this problem comprising a loop of bead chain or other material placed about the neck of the flask to support the rotating flask at an acute angle in the bath, thereby allowing more material to be frozen at one time. This approach would not work for all types and configurations of flasks, however. Further, while the mechanical rollers rotating the flask could have various spacings to accommodate different flask sizes, serious limitations still existed in the number and variety of flask diameters which would be used. The thermal transfer liquid in use is commonly alcohol, which poses an obvious fire hazard when the bath is not in use or is being circulated while cooled down to operating temperatures. This danger in the use of such a bath increases as a result of both its large volume and the electric stirrers necessary to circulate the bath. The large volume of alcohol necessary in this type of bath also necessitates a long wait when cooling the bath to operating temperatures. A further disadvantage in such shell freezers lies in the roller surfaces, which tend to slip on the surface of the flask when in the alcohol bath, thereby rotating the flask in an uneven manner and resulting in an uneven distribution of frozen material within the flask.

Therefore, an object of the subject invention is an improved shell freezer which will quickly and efficiently freeze a given quantity of liquid evenly about the interior of a flask.

Another object of the subject invention is a shell freezer which will accommodate a wider variety of flask sizes than heretofore possible.

A further object of the subject invention is a shell freezer which has a tiltable bath to allow a greater quantity of liquid to be frozen.

A still further object of the subject invention is the use of a minimum amount of heat exchange liquid while retaining the ability to freeze large amounts of sample in a short time.

SUMMARY OF THE INVENTION

These and other objects are obtained in accordance with the present invention wherein there is provided a modular shell freezer for either bench top or built-in operation. The shell freezer itself has a tank in which the sample bottles are rotated on a belt while the heat exchange liquid (methanol) is flowed into the belt and about the rotating flasks. The sample bottles or flasks are supported on a revolving conveyor belt as the sample bottles are retained within a definite space within the bath by retention rods. These sample bottles rotate through the action of the revolving conveyor belts. As the bottles revolve, a continuous stream of cooled (generally −40° C.) heating exchange liquid on the belt is passing under and around each bottle. As no more than a thin stream of thermal transfer liquid is present at any time about the bottles, there is no need for a large amount of liquid and the attendant refrigeration and fire hazard problems present with such large amounts. To initiate the freezing process, a large amount of sample may be frozen through the actual tilting of the entire bath to a maximum of 16° C. Once sufficient freezing of the sample has reduced the volume of liquid sample, the bath may be returned in progressive increments to a level position. Thus, a much more uniform thickness of ice from top to bottom of the flask is achieved as well as a more uniform drying of the sample. The belt itself comprises a polyester material and rides on a stainless steel platen laminated with a layer of cloth. Thus, a smooth, cushioned rotation is provided for the flasks. The thermal transfer liquid is cooled by a heat exchanger comprising a ribbed tubing, through which the refrigerant passes, located within a partially flattened outer tubing. The oval shape of the outer tubing forms two distinct inner chambers within the outer tubing separated by the inner tubing. The spent liquid from the bath enters one of these interior chambers and passes between the ribs of the cooling refrigerant containing inner tubing to reach the other chamber. Thus, a large amount of heat transfer area is present to efficiently cool the bath liquid for circulation back to the shell freezing area of the bath. The cooled heat transfer liquid then goes to a manifold which is integrally attached to the bath, having a plurality of jets which direct the alcohol across the belts and about the rotating flasks.

DESCRIPTION OF THE DRAWINGS

Further objects of the invention, together with additional features contributing thereto and advantages accruing therefrom will be apparent from the following description of one embodiment of the invention when read in conjunction with the accompanying drawings wherein:

FIG. 3 is a cross sectional view taken along the line 3—3 of FIG. 2 showing the interior of the bath with a portion cutaway showing the manifold;

FIG. 4 is a cross section taken along the line 4—4 of FIG. 3 showing the mechanism for tilting the bath;

FIG. 5 shows the heat exchanger of the subject invention; and,

FIG. 6 shows the cross section taken along the line 6—6 of FIG. 5 showing the two chambers which the bath liquid passes through in the interior chamber through which the refrigerant passes.

Referring now to FIG. 1 there is shown a shell freezer 10 comprising a bath or tank 16 pivotally mounted at 60 on base or frame 12. Within the freezing path 16, sealed cylindrical receptacles 11, such as standard freeze drying flasks or the like, are rolled or rotated on belts 20 against stationary rods 25 which are positioned within the bath above the belts 20 and transverse to the direction of rotation of the belts 20. These rods 25 may be placed at varying heights and distances from each other to provide stops within the bath 16, increasing the capability of the bath to accommodate flasks of a large variety of sizes. The rods are preferably telescoping and extensibly spring-loaded so they may be secured in openings 27 in the bath walls. Rollers 26 are provided on the rods 25 to allow substantially friction-free rotation of a flask on the belt 20. These rollers 26 may be easily positioned along the length of the rod and perform much in the same manner as paper bail rollers in a typewriter. While rotating, a freezing liquid 41 circulates around and about each receptacle 11, being pumped from jets 40 onto the rotating belts 20 (FIG. 2).

Figure 1:
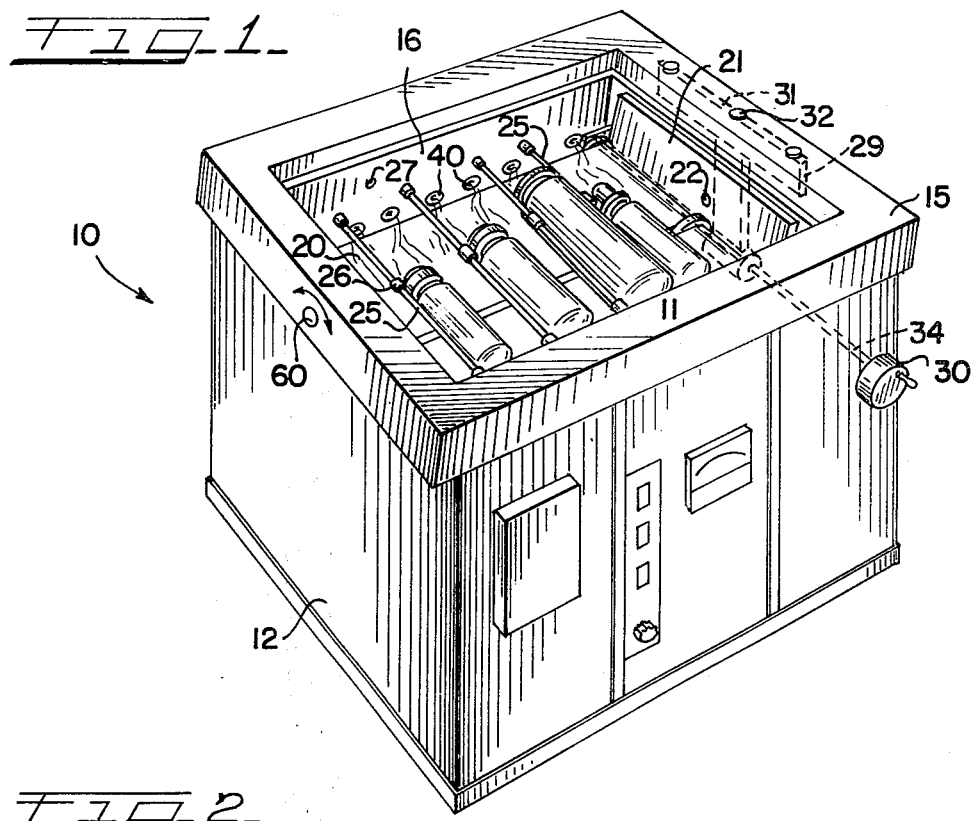
FIG. 1 is a perspective view of the shell freezer of the subject invention showing the bath in a tilted position.
Figure 2:
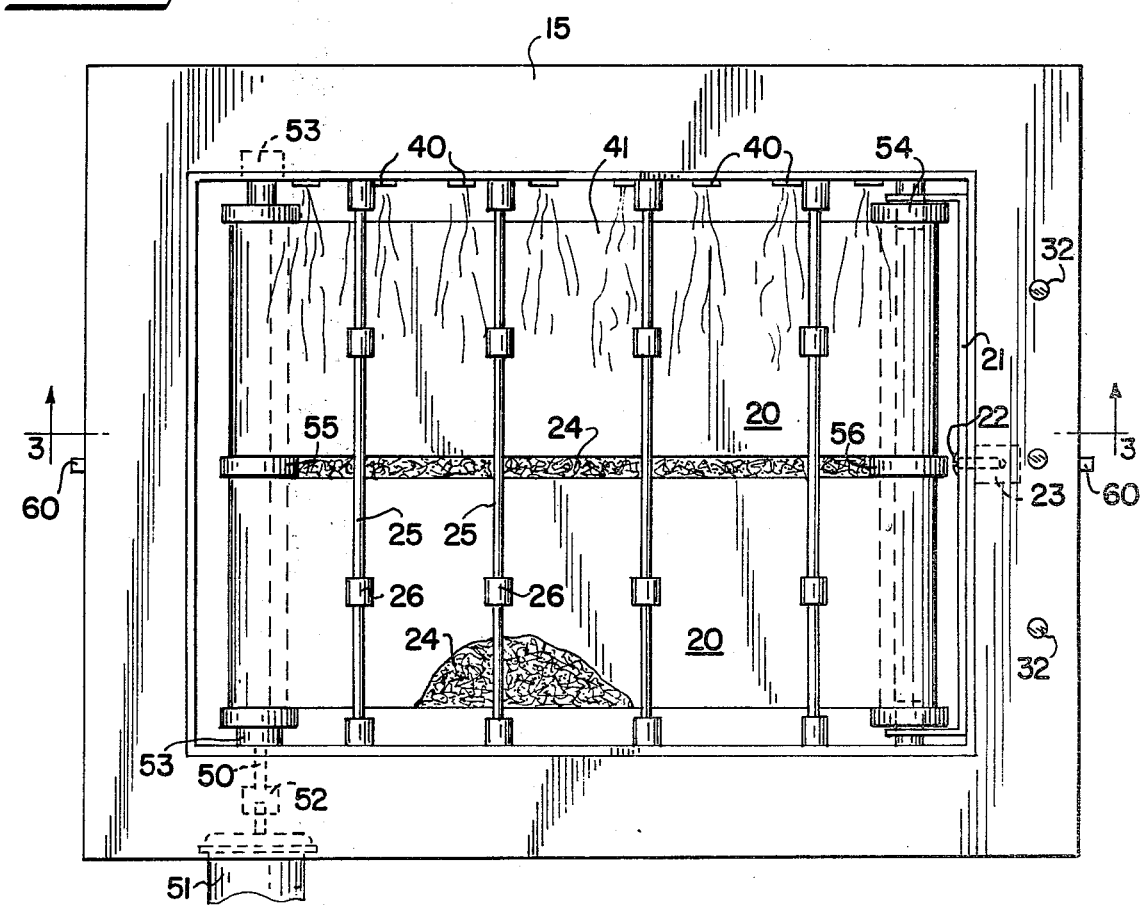
FIG. 2 is a top plan view of the shell freezer of the subject invention with a portion of the conveyor belt cutaway to show the cloth backing over which it rides.

The belts 20 may comprise one or more sheets of endless plastic material having the property of remaining flexible at temperatures down to −40° C. and lower, preferably a translucent sheet of polyethyleneterephthalate, marketed under the trademark Mylar ®. These belts are rotated by and about drive roller 55 and idler roller 56 (FIG. 3). Drive roller 55 is journaled and sealed in bearings 53 mounted at opposite ends of the roller in the bath walls. Operatively connected to the drive roller 55 is drive shaft 50 which is coupled at 52 to the drive motor 51 to allow limited vertical movement of the bath and drive roller while providing impetus for rotational movement of the drive roller 55. Idler roller 56 is journaled for rotation between bearing housings 54 which are fixedly attached to mounting plate 21. This mounting plate is movable toward and away from drive roller 55 within the tank 16 to allow adjustment of the belt tautness. Adjustment of the belt is accomplished by the placement of the mounting plate relative to the bath wall through the loosening or tightening of adjustment screw 22 in fixed nut 23 mounted to base 12.

At the low temperatures involved in shell freezing, a belt alone could not provide sufficient support for a flask full of solution to be frozen. Therefore a means of providing supplemental support to the belt becomes desirable. Were a simple rigid platen placed between the rotating belt surface for support of the upper belt surface, the contact of the belt with the platen would cause jerking and pulling of the belt as a result of the friction encountered at the cold temperatures, and in addition, would scratch the flask. Lowering the friction-coefficient of the platen by using one of polytetrafluoroethylene did not solve the problem, apparently as a result of the large surface area contact. In the subject invention the support difficulty has been alleviated by causing the belts 20 to ride over a layer of cloth 24 mounted on a rigid platen 19. For best results, a cloth having rough, closely knitted or matted strands, such as felt or velvet has been found to give optimum results.

As shown in FIG. 3, the cloth 24 is mounted on a rigid platen 19, preferably of stainless steel, thereby providing sufficient support for any size and weight container which might be sought to be freeze dried. The use of the matted fibers 24 enables the tightly stretched belt 20 to pass over the steel plate 19 in a smooth, cushioned manner while deriving full benefit of a strong support surface.

The entire bath 16 is pivotal about pin 60, which pivotally secures the bath on either side of the base or frame 12. The means for pivoting the tank 16 include a T-bar assembly (FIG. 4), which is rigidly attached at the cross bar or horizontal member 31 by suitable fastening means at points 32 on the exterior frame 15 of the bath 16. Thus, by swinging the verticle member 29 of the T-bar assembly in an arc, the entire bath 16 will pivot about pins 60. At the bottom end of the verticle member 29 is a nut 33 mounted for vertical sliding movement on the vertical member. This nut 33 is engaged with lead screw 34 which is threaded on its midsection for that purpose. Lead screw 34 is journaled at one end in journal box 35 fixedly attached to base 12; at the other end, lead screw 34 may be rotated through tilting knob 30 to cause lead screw nut 33 to move horizontally. This horizontal movement of the lead screw nut causes the nut 36 to push the pivot arm or verticle portion of the T-bar 29 in an arc. Pin 36 is movable within slot 37 in the vertical bar to allow pivot arm 31 to move in the arc.

Movement of pivot arm 31 by virtue of its rigid attachment of the cross bar portion 31 to the underside of the bath frame 15 causes the attitude or angle of the bath 16 to be varied. Because of this tilting feature of the bath 16, vessels 11 may be initially rotated when substantially full without danger of spilling the flask's contents. As the freezing occurs along the interior walls of the vessel 11, the bath may be progressively levelled to provide a much more uniform wall thickness of ice in the vessel 11 than previously possible in the prior art. This capability for a more uniform thickness promotes a faster and more uniform drying of material. The tilting mechanism itself is self locking as a result of the threaded connection of the lead screw 34 with the pivot arm 33. Thus, no separate locks are required to maintain the bath at a desired angle. Further, the tilting mechanism of the subject invention allows an effortless analog adjustment of the bath angle without a danger of jerking or accidently shifting the bath to too great an angle while making an adjustment.

As already stated, jets 40 positioned in the side of the bath 16 provide a continuous flow or stream of a thermal exchange fluid 41, preferably alcohol, cooled to approximately −40° C. across the rotating belts 20. This freezing liquid is pumped from a heat exchanger 70, to be described. The fluid is introduced into a manifold 44 through conduits 43. Spaced openings or jets 40 in the manifold 44 communicate with the interior of the bath 16 through similarly spaced openings 42 in the walls of the bath 16. In the manufacture of the shell freezer of the subject invention, the manifold is placed against the side of the bath 16 in alignment with the larger openings 45. The manifold 44 is then heliarc welded to the larger bath openings 45 without melting the edges of the manifold jets 40.

The cooling solution is directed out into the bath 16 from the manifold to form a thin film of −40° C. liquid passing over the top belt surface 20. The freezing solution then flows to the bottom of the bath 17 into the outlet or the pump conduit 42. A pump (not shown) forces the thermal exchange solution to the heat exchanger 70 (FIG. 5) where the warm fluid is cooled and circulated back to the jets, to recycle the freezing solution over the belt. Thus, there is no reservoir of freezing solution and a minimum of this solution is needed for freezing even the largest of containers.

The heat exchanger 70, by reason of its construction, may be mounted in a number of positions within the shell freezer, such as in the bath itself or outside the bath 16. Preferably the heat exchanger 70 is mounted in an upright position underneath the bath 16. This cooling apparatus comprises a convoluted or ribbed inner cylinder 71 which acts an an evaporator unit having a capillary tube 72 by which the refrigerant passes into the inner cylinder 71 and expands, thereby cooling the inner cylinder 71 as in a standard refrigeration cycle. The expanded refrigerant is then drawn out of the inner cylinder 71 to a refrigeration apparatus (not shown) where it is again condensed and pumped back through the capillary tube to repeat the sequence. An outer flattened cylinder 74 contains and encompasses the inner cylinder 71 (FIG. 6) in its midsection, providing an inlet compartment 75 and an outlet compartment 76 on opposing sides of the inner cylinder. One end of the heat exchanger 70 is closed off by plate 73 and welded to provide a fluid tight seal. The opposite end of the heat exchanger 70 includes a conduit 42 for carrying the spent thermal exchange solution from the bath 16, circulating it through the heat exchanger where the liquid is cooled down to the desired temperature by passing the liquid from the inlet compartment 75 to the outlet compartment 76 over the surfaces of the cooled inner cylinder and evaporator 71 where heat from the fluid is absorbed and the fluid is then forced out again through conduit 43 to be circulated back to the manifold 44.

In one embodiment of the invention, the pump (not shown) for circulating the freezing liquid has controls which are separate and distinct from those controls for the refrigeration unit (also not shown). Thus, the thermal exchange solution need not be circulated through the bath 16 until the refrigeration unit has sufficiently cooled the refrigerant to make efficient use of the condenser unit 71 in cooling the solution. In this manner, the thermal exchange solution need not be circulated within the bath while warm, thereby obviating the dangers of evaporation of warm thermal exchange solution and reducing the fire hazards which are omnipresent with such warm solutions as alcohols.

The circulation of the thermal transfer solution over the belts 20 thus eliminates the necessity of a large volume of flammable liquid in the bath. It further eliminates the need for a mechanical stirrer so that a potential source of sparks is taken away from the hazardous area.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A shell freezer for the freezing of liquids in containers, said liquids freezing in a substantially uniform manner on the interior walls of the containers, said freezer comprising a bath, a rotating endles belt assembly within said bath, said containers being supported by and rotating on said endless belt assembly, thermal transfer fluid circulating within said bath across said endless belt assembly thereby contacting said rotating containers and freezing the liquid contents of said containers about its interior in a uniform manner, said bath including rods selectively positioned above said belts in a plane transverse to the plane of rotation of said belts, said rods providing a stop against which containers may rotate, said stops retaining said containers for rotation on said belt in a desired position within said bath.

2. The shell freezer of claim 1 wherein said bath is adjustably pivotable in an analog manner in a plane perpendicular to the plane of the rotation of said endless belt.

3. The shell freezer of claim 1 wherein said endless belt is formed of a polyester film.

4. The shell freezer of claim 1 wherein said belt assembly comprises at least two endless belts positioned about an idler roller and a drive roller, said drive roller being operatively coupled to a drive means for rotation, thereby rotating said belts.

5. The shell freezer of claim 4 wherein said idler roller is movably adjustable toward and away from said drive roller for tensioning said belts.

6. The shell freezer of claim 4 wherein said belts are rotated about a platen disposed between said drive roller and said idler roller, said platen providing sufficient support for a container rotating on said belt.

7. The shell freezer of claim 6 wherein a fabric is mounted on said platen to allow a smooth rotation of said belts over said platen while providing for sufficient support of a container rotating on said belt.

8. A shell freezer for the freezing of materials in a substantially uniform manner within an enclosed container with a minimum of thermal transfer fluid, said freezer comprising a bath, said bath having an outlet, a rotating means for rotating said container within said bath, a thermal transfer fluid, a heat exchange means for cooling said thermal transfer fluid to a desired low temperature, said outlet being in direct communication with said heat exchange means, a plurality of jets communicating with said heat exchange means for uniformly circulating said thermal transfer fluid over said rotating means and around said rotating container, said heat exchange means including a convoluted tubing having an undulated outer surface, said heat exchange means being enclosed in a flattened cylinder to form an intake compartment and an exit compartment, said thermal transfer fluid circulating from said outlet to said intake compartment and passing over said undulated outer surface to said exit compartment, thereby being cooled by said undulated outer surface to said desired temperature prior to passing from said exit compartment to said jets, said jets providing a constant flow of thermal transfer fluid at said desired temperature about said container, said flowing thermal transfer fluid cooling said container and said materials within said container below the freezing point of said materials, said rotation of said containers thereby causing a substantially uniform frozen layer within said container.

9. The shell freezer of claim 8 wherein said rotating means comprise an endless belt positioned within said bath in a substantially horizontal manner for rotation about at least two roller means.

10. The shell freezer of claim 10 wherein said heat exchange means comprises an evaporator of a refrigerator system for cooling said thermal transfer fluid externally of said bath.

11. A shell freezer for the uniform freezing of liquids contained in cylindrical flasks about the interior flask walls comprising the combination of a frame, a bath, rotating means within said bath for rotating said flasks, thermal transfer fluid of a desired low temperature circulating within said bath and about said rotating flasks, said bath being mounted on said frame for limited pivotal movement relative to said frame to allow said flasks to be rotated at an angle, thereby permitting a flask substantially full of liquids to be rotated within said bath without spilling and liquid prior to freezing.

12. The shell freezer of claim 11 wherein said bath is pivoted on said frame by a pivoting means in a smooth analog manner.

13. The shell freezer of claim 12 wherein said pivoting means comprises a first member rigidly attached to said bath, an end of a second member rigidly attached at an angle to said first member, said second member having a threaded bushing slidably mounted thereon for vertical movement at an opposing end, a tilting rod being threaded on at least a midsection thereof, said threaded bushing being engaged with said threaded mid-section of said tilting rod whereby the rotation of said tilting rod causes said bushing to move along the axis of said tilting rod, said second member following said bushing to thereby tilt said bath at a desired angle upon said frame.

* * * * *

UNITED STATES PATENT AND TRADEMARK OFFICE
CERTIFICATE OF CORRECTION

PATENT NO. : 4,139,992
DATED : February 20, 1979
INVENTOR(S) : Douglas S. Fraser It is certified that error appears in the above-identified patent and that said Letters Patent are hereby corrected as shown below:

In Column 1, line 41, change "liquid" to -- fluid --.

In Column 6, line 67, change "10" to -- 8 --.

In Column 7, last line, change "and" to -- said --.

Signed and Sealed this

Nineteenth Day of June 1979

[SEAL]

Attest:

RUTH C. MASON
Attesting Officer

DONALD W. BANNER
Commissioner of Patents and Trademarks